(12) United States Patent  
Jessie, Jr.

(10) Patent No.: US 8,459,679 B2
(45) Date of Patent: Jun. 11, 2013

(54) PIVOT MECHANISM FOR SCOOTERS, TRICYCLES AND THE LIKE

(75) Inventor: Donald K. Jessie, Jr., Middletown, OH (US)

(73) Assignee: Huffy Corporation, Centerville, OH (US)

( * ) Notice: Subject to any disclaimer, the term of this patent is extended or adjusted under 35 U.S.C. 154(b) by 293 days.

(21) Appl. No.: 12/838,888

(22) Filed: Jul. 19, 2010

(65) Prior Publication Data

US 2011/0018226 A1    Jan. 27, 2011

Related U.S. Application Data

(60) Provisional application No. 61/227,402, filed on Jul. 21, 2009.

(51) Int. Cl.
*B62K 19/30* (2006.01)

(52) U.S. Cl.
USPC .......................................................... 280/282

(58) Field of Classification Search
USPC ................. 280/282, 287, 298, 87.041, 87.05, 280/278; 403/92, 91, 83
See application file for complete search history.

(56) References Cited

U.S. PATENT DOCUMENTS

| | | |
|---|---|---|
| 1,379,305 A | 4/1921 | Johns |
| 2,692,153 A | 10/1954 | Schlueter |
| 2,921,773 A | 1/1960 | Hoelzer |
| 4,079,957 A | 3/1978 | Blease |
| 4,105,347 A | 8/1978 | Gossage |
| 4,407,045 A | 10/1983 | Boothe |
| 4,657,270 A | 4/1987 | Allen et al. |
| 4,707,884 A | 11/1987 | Chang |
| 4,821,832 A | 4/1989 | Patmont |
| 4,929,113 A | 5/1990 | Sheu |
| 5,060,894 A | 10/1991 | Hillinger |
| 5,197,817 A | 3/1993 | Wood et al. |
| 5,228,535 A | 7/1993 | McCarty |
| 5,542,151 A | 8/1996 | Stranski et al. |
| 5,568,934 A | 10/1996 | Niemeyer |
| 5,586,363 A | 12/1996 | Fanuzzi |
| 5,722,477 A | 3/1998 | Richter et al. |
| 5,765,855 A | 6/1998 | Chiu |
| 5,807,007 A | 9/1998 | Stemper |
| 5,820,288 A | 10/1998 | Cole |
| 5,867,911 A | 2/1999 | Yates et al. |
| 6,135,668 A | 10/2000 | Lin |
| 6,148,698 A | 11/2000 | Hsieh |
| 6,196,568 B1 * | 3/2001 | Stevens ..................... 280/304.1 |
| 6,206,387 B1 | 3/2001 | Tsai |
| D441,035 S | 4/2001 | Yam |

(Continued)

*Primary Examiner* — Tashiana Adams
(74) *Attorney, Agent, or Firm* — Wood, Herron & Evans, LLP

(57) ABSTRACT

A pivot mechanism includes a base member configured to be coupled to a first element and a generally cylindrical rotating member configured to be coupled to a second element. An elongate pin extends through the base member and rotating member and defines a pivot axis. The rotating member is capable of rotating relative to the base member about the pivot axis. The elongate pin is movable in a direction generally parallel to the pivot axis between a secured position and a release position. In the secured position, the rotating member is prevented from rotating relative to the base member, and in the release position, the rotating member is permitted to rotate relative to the base member. The pivot mechanism may be incorporated into a scooter or a tricycle to provide different configurations thereof.

22 Claims, 6 Drawing Sheets

U.S. PATENT DOCUMENTS

| | | |
|---|---|---|
| 6,216,317 B1 | 4/2001 | Chen |
| 6,244,605 B1 * | 6/2001 | Liu .................. 280/87.041 |
| 6,331,091 B2 | 12/2001 | Cross |
| 6,332,621 B1 | 12/2001 | Wu |
| 6,390,483 B1 * | 5/2002 | Hsu et al. ............. 280/87.041 |
| 6,406,042 B1 | 6/2002 | Tsai |
| 6,431,567 B2 | 8/2002 | Tsai |
| 6,443,470 B1 | 9/2002 | Ulrich et al. |
| 6,450,517 B1 | 9/2002 | Lee |
| 6,503,018 B2 | 1/2003 | Hou et al. |
| 6,848,344 B2 | 2/2005 | Rocco |
| 7,063,341 B2 | 6/2006 | Tsai |
| 7,096,537 B2 | 8/2006 | Chen |
| 7,159,884 B2 | 1/2007 | Gu |
| 7,192,038 B2 | 3/2007 | Tsai |
| 7,210,696 B2 | 5/2007 | Kettler et al. |
| 7,226,081 B2 * | 6/2007 | Chen ....................... 280/771 |
| 7,237,463 B1 | 7/2007 | Lee |
| 7,300,066 B2 * | 11/2007 | Kettler et al. ............. 280/287 |
| 7,306,246 B2 | 12/2007 | Gale |
| 7,341,392 B2 | 3/2008 | Yeh |
| 7,455,308 B2 | 11/2008 | Michelau et al. |
| 7,631,575 B2 * | 12/2009 | Gard et al. ................. 74/530 |
| 2002/0020980 A1 | 2/2002 | Lee |
| 2003/0141695 A1 * | 7/2003 | Chen ....................... 280/287 |
| 2006/0103097 A1 * | 5/2006 | Chen ...................... 280/87.05 |
| 2006/0237934 A1 | 10/2006 | Tsai |
| 2009/0160150 A1 | 6/2009 | Johnson |

* cited by examiner

PIVOT MECHANISM FOR SCOOTERS, TRICYCLES AND THE LIKE

CROSS-REFERENCE TO RELATED APPLICATION

This application claims the benefit of U.S. Provisional Application Ser. No. 61/227,402, filed Jul. 21, 2009, the specification of which is hereby incorporated by reference in its entirety.

TECHNICAL FIELD

The invention relates generally to scooters, tricycles and the like and, more particularly, to an improved pivot mechanism for scooters, tricycles and the like configured to improved their use and functionality.

BACKGROUND

Scooters and tricycles are among the most popular items for children. Although many developments have improved the original design of these items, conventional designs continue to have shortcomings that manufacturers strive to improve upon. In regard to scooters, many conventional scooter designs allow the scooter to fold so as to facilitate storage, packaging, etc. To this end, many designs call for a fold mechanism that allows the steering assembly to fold over the deck of the scooter. These designs may further include various lock mechanisms that lock the steering assembly in a ready-to-use position and in a storage position.

Conventional fold mechanism designs, however, have some drawbacks. By way of example, the fold mechanisms are generally complex in their design and as a result, may be expensive and difficult to manufacture. Additionally, some fold mechanism designs are generally open so as to expose sharp edges and/or moving parts to the user. Such designs are generally undesirable and may present some safety concerns, such as, for example, providing a potential pinch point for the user.

In regard to tricycles, there are several versions or types of tricycles that are offered to today's consumers. For example, one type of tricycle is a conventional tricycle design wherein the front wheel is positioned substantially underneath the handlebar and the saddle is located relatively high on the frame. Such a conventional tricycle design is referred to herein as a high rider. Another type of tricycle, however, has a chopper design wherein the front wheel is located forward of the handlebar and the saddle is positioned relatively low on the frame. Such a modified tricycle is referred to herein as a low rider.

Conventionally, if a child desired both types of tricycle, his or her parents had to purchase two separate tricycles, each having the desired configuration. However, in some instances, convertible tricycles have been made available capable of converting between the conventional high rider configuration and a low rider configuration. In this regard, these convertible devices typically include costly, relatively complex mechanisms for converting between the two configurations. Additionally, these mechanisms may include exposed parts or surfaces that present relatively sharp edges, provide potential pinch points, and/or pose other safety concerns to the user of the convertible tricycle.

Thus, while conventional scooters and tricycles are generally successful for their intended purpose, there remains a need for improved designs that address these and other shortcomings in conventional construction.

SUMMARY

A pivot mechanism includes a base member configured to be coupled to a first element and a generally cylindrical rotating member configured to be coupled to a second element. The base member includes a bottom wall, a pair of opposed side walls, and a pair of opposed end walls that collectively define a cavity. At least one of the end walls has a first aperture therethrough. The rotating member includes a side wall and a pair of opposed end walls and is at least partially positioned within the cavity of the base member. At least one of the end walls has a second aperture therethrough. An elongate pin extends through the first and second apertures in the base member and rotating member and defines a pivot axis. The rotating member is capable of rotating relative to the base member about the pivot axis to provide relative movement between the first and second elements. The elongate pin is movable in a direction generally parallel to the pivot axis between a secured position and a release position. In the secured position, the rotating member is prevented from rotating relative to the base member. In the release position, the rotating member is permitted to rotate relative to the base member.

A locking mechanism prevents rotation of the rotating member relative to the base member when the pin is in the secured position. In one embodiment, the locking mechanism includes at least one key on the pin and at least one keyway on the base member. When the key engages the keyway, the rotating member is prevented from rotating relative to the base member and when the key disengages the keyway, the rotating member is permitted to rotate relative to the base member. The pin may be biased, such as by a spring, toward the secured position.

The pivot mechanism may be incorporated in a wide range of child vehicles. In one embodiment, for example, the pivot mechanism may be incorporated in a scooter. The scooter includes a first frame portion having a deck and a rear wheel and a second frame portion having a steering assembly with a front wheel and a handlebar. The pivot mechanism couples the first and second frame portions to provide pivotal movement therebetween. In this regard, the pivot mechanism defines a ready-to-use position of the scooter and a folded position of the scooter. In another embodiment, the pivot mechanism may be incorporated into a tricycle. The tricycle includes a first frame portion having a steering assembly with a front wheel and a handlebar and a second frame portion having a pair or rear wheels. The pivot mechanism couples the first and second frame portions to provide pivotal movement therebetween. For example, the pivot mechanism defines a high rider configuration and a low rider configuration of the tricycle. The pivot mechanism may also define a storage configuration of the tricycle.

A method of pivoting a first frame portion relative to a second frame portion includes moving a push pin in a first direction generally parallel to the pin to disengage a key from a keyway; rotating a rotating member relative to the base member when they key and keyway are disengaged; and moving the push pin in a second direction generally parallel to the pin to engage the key with the keyway and lock the relative positions of the first and second frame portions.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
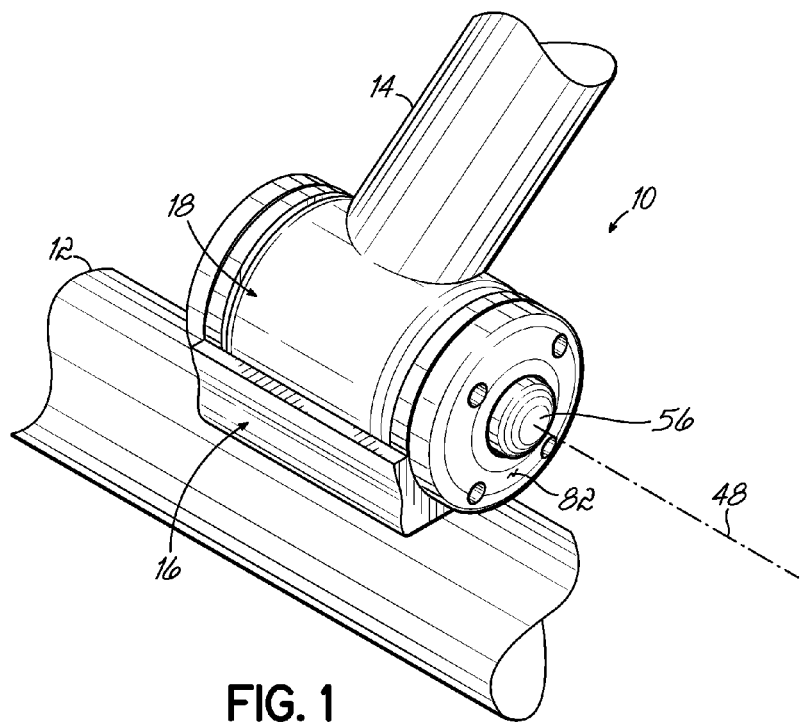
FIG. 1 is a perspective view of a pivot mechanism in accordance with an exemplary embodiment of the invention.
Figure 2:
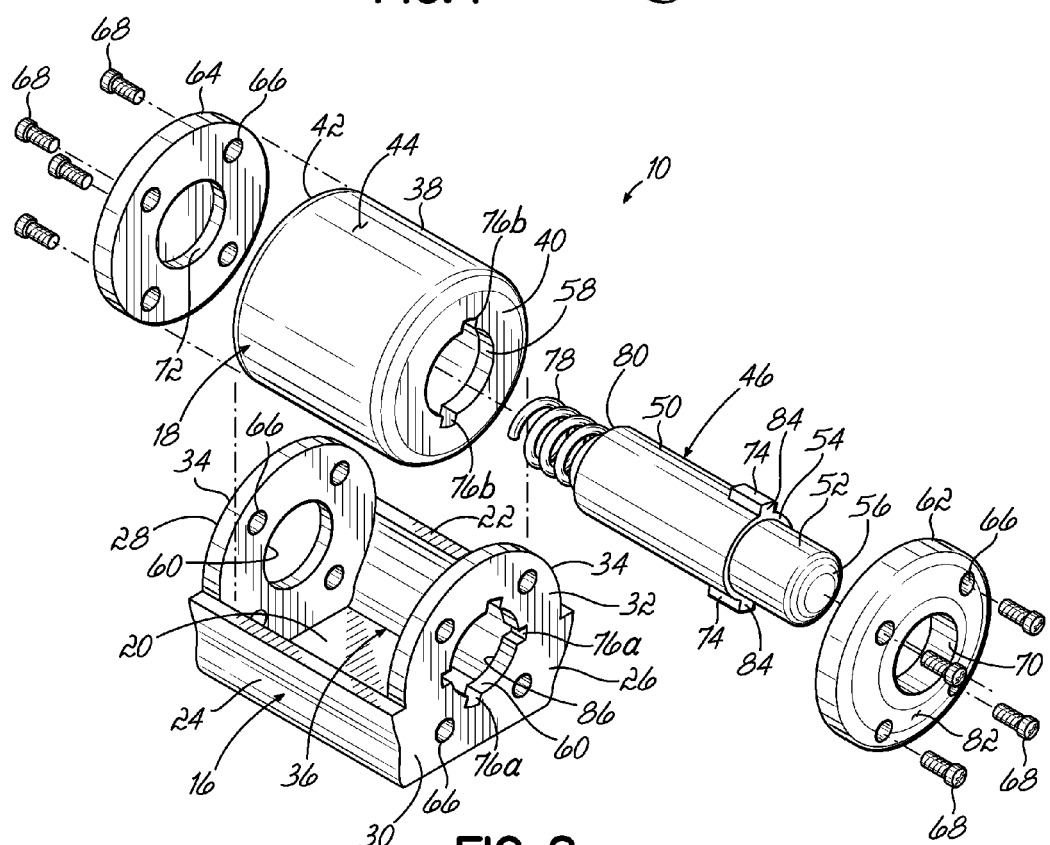
FIG. 2 is a perspective exploded view of the pivot mechanism illustrated in FIG. 1.

Referring now to the drawings and to FIGS. 1 and 2 in particular, a pivot mechanism 10 in accordance with an exemplary embodiment of the invention is shown. The pivot mechanism 10 is configured to allow a first element 12 to rotate relative to a second element 14. The pivot mechanism 10 includes a base member 16 configured to be secured to one of the first or second element 12, 14, and a rotating member 18 rotatably mounted to base member 16 and secured to the other of the first or second element 12, 14. In accordance with an aspect of the invention, the pivot mechanism 10 has a generally closed configuration to reduce or eliminate sharp edges and exposed parts.

In one embodiment, the base member 16 includes a generally planar bottom wall 20, a pair of opposed side walls 22, 24, and a pair of opposed end walls 26, 28. The bottom wall 20 may be configured to be secured to the first element 12, such as through welding, adhesives, fasteners, or other suitable means. In one embodiment, the side walls 22, 24 do not extend for a full height of the pivot mechanism 10, but extend for only a portion of the height. The height of the side walls 22, 24 may vary depending on the particular application. For example, the height of the side walls 22, 24 may be determined by the desired angle through which the second element 14 is configured to move during the pivoting motion. Each of the end walls 26, 28 includes a lower portion 30 and an upper portion 32. The lower portion 30 is configured to meet the side walls 22, 24 at edges thereof. The upper portion 32, however, is configured to extend above the side walls 22, 24. In one exemplary embodiment, the upper portion 32 of end walls 26, 28 may define a generally arcuate surface 34. For example, in one embodiment the arcuate surface 34 may be a circular arc. Other arcuate shapes, however, may also be possible. As shown in FIG. 2, the base member 16, and more particularly the walls thereof, defines a cradle that, in turn, generally defines a cavity 36 configured to receive and support the rotating member 18 therein, as explained in more detail below.

The rotating member 18 may be generally positioned within the cavity 36 defined by base member 16 and includes a generally cylindrical configuration, as illustrated in FIG. 2. The rotating member 18 includes a side wall 38 and opposed end walls 40, 42. The side wall 38 may be configured to be secured to the second element 14, such as through welding, adhesives, fasteners, or other suitable means. When the rotating member 18 is positioned within cavity 36, the end walls 40, 42 may be adjacent the end walls 26, 28 of the base member 16 (e.g., may abut or be slightly spaced therefrom). Additionally, the outer surface 44 of side wall 38 may be generally flush with the arcuate surface 34 defined by the end walls 26, 28. Such a configuration provides a relatively smooth and contoured look to pivot mechanism 10.

To provide the pivotal relation between the first and second elements 12, 14, the rotating member 18 is pivotally or rotatably mounted relative to the base member 16. In this regard, pivot mechanism 10 includes a generally elongate push pin 46 adapted to rotatably mount the rotating member 18 to base member 16 and define a pivot axis 48 about which the rotating member 18 (and thus the second element 14) rotates. For reasons that will become clearer below, the push pin 46 has a generally cylindrical configuration and includes an inner body portion 50 having a first cross dimension (e.g., diameter) and an outer body portion 52 having a second cross dimension less than the first cross dimension to define a shoulder 54 therebetween. The outer end of outer body portion 52 generally defines a push button 56.

In one embodiment, the push pin 46 may be configured to extend along the centerline of the generally cylindrical rotating member 18. To this end, at least one of end walls 40, 42, and preferably both of end walls 40, 42, includes a central aperture 58 configured to receive push pin 46. The central aperture 58 may have the same cross-sectional shape as push pin 46 (e.g., circular) and be sized to snugly receive the push pin 46, and more particularly, the inner body portion 50 of push pin 46, therein. To secure the rotating member 18 to the base member 16, at least one of the end walls 26, 28 of base member 16 also includes a central aperture 60 configured to receive push pin 46. In a similar manner as described above, the central aperture 60 may have the same cross-sectional shape as push pin 46 (e.g., circular) and may be sized to snugly receive the push pin 46, and more particularly, the inner body portion 50 of push pin 46, therein. When the push pin 46 is disposed through the central apertures 58, 60 of the base member 16 and the rotating member 18, the only relative motion permitted therebetween is rotation above pivot axis 48.

To secure the push pin 46 in place within the base member 16 and rotating member 18, the pivot mechanism 10 may include a pair of cover plates 62, 64 secured to the outer surface of end walls 26, 28, respectively. By way of example, and in one embodiment, the cover plates 62, 64 and end walls 26, 28 may include threaded bores 66 configured to receive a threaded fastener 68 to secure the cover plates 62, 64 thereto. Those of ordinary skill in the art will recognize other suitable fasteners to secure the cover plates 62, 64 to the end walls 26, 28 of base member 16. In one embodiment, the cover plates 62, 64 may be generally circular in shape. Thus, for example, at least a portion of the outer edge of cover plates 62, 64 may be generally flush with the arcuate surface 34 defined by the end walls 26, 28. Again, such a configuration provides a relatively smooth and contoured look to pivot mechanism 10.

As shown in FIG. 2, cover plate 62 includes a central aperture 70 adapted to receive the push pin 46. The central aperture 70 may have the same cross-sectional shape as push pin 46 (e.g., circular) and be sized to snugly receive the push pin 46, and more particularly, the outer body portion 52 of push pin 46, therein. Moreover, the size of central aperture 70 is such that, while capable of receiving the outer body portion 52 therein, central aperture 70 is smaller than the inner body portion 50 of push pin 46. In this way, the inner body portion 50 is too large to extend through central aperture 70. Accordingly, once the push pin 46 is in place and the cover plate 62 is secured to the base member 16, the push pin 46 is not capable of being removed from the central apertures 58, 60 of base member 16 and rotating member 18.

In regard to cover plate 64, in one embodiment, cover plate 64 includes a blind bore 72, as shown in FIG. 2. The blind bore 72 may have the same cross-sectional shape as push pin 46 (e.g., circular) and be sized to snuggly receive the push pin 46, and more particularly, an end of the outer body portion 52. The blind bore 72 is closed off by a solid wall and thus, the push pin 46 will not be able to be removed from central apertures 58, 60 of base member 16 and rotating member 18 by moving the push pin 46 along pivot axis 48 and toward cover plate 64.

In one aspect in accordance with the invention, in addition to providing the pivot axis 48 for pivot mechanism 10, the push pin 46 also provides at least in part a locking mechanism for securing the second element 14 in at least one, and preferably a plurality of positions, relative to the first element 12. In this regard, the locking mechanism includes at least one, and preferably a plurality of projections or keys 74 on push pin 46 that cooperate with at least one, and preferably a plurality of recesses or keyways 76 formed in the base member 16 and rotating member 18. When keys 74 engage certain keyways 76, rotating member 18 (and thus second element 14) is prevented from rotating relative to base member 16 (and thus first element 12). However, when keys 74 disengage certain keyways 76, rotating member 18 may be rotated relative to base member 16.

As shown in more detail in FIG. 2, push pin 46 includes at least one, and preferably a plurality of, keys 74 projecting radially therefrom. As shown in this figure, the keys 74 project from the inner body portion 50 and extend in a direction generally parallel to the pivot axis 48 and beginning at the shoulder 54. In one embodiment, the keys 74 extend for only a portion of the length of the inner body portion 50. However, the length is sufficient to permit proper operation of the locking mechanism as explained in more detail below. The keys 74 are configured to cooperate with keyways 76 formed in the base member 16 and rotating member 18. To this end, and as illustrated in FIG. 2, end wall 26 of base member 16 includes at least one, and preferably a plurality of keyways 76a configured to engage the keys 74. In one embodiment, the keyways 76a may be configured as recesses or notches that are open to central aperture 60 and extend radially outward therefrom. Similarly, end wall 40 of rotating member 18 includes at least one, and preferably a plurality of keyways 76b configured to engage the keys 74. In one embodiment, the keyways 76b may be configured as recesses or notches that are open to central aperture 58 and extend radially outward therefrom.

Operation of the locking mechanism will now be described. As an initial matter, it should be realized that the push pin 46 is movable in a direction generally parallel to the pivot axis 48 between a first, secured position, wherein the first and second elements 12, 14 are fixed relative to each other (e.g., the rotating member 18 is not permitted to rotate relative to base member 16), and a release position, wherein the first and second elements 12, 14 are movable relative to each other (e.g., the rotating member 18 is permitted to rotate relative to the base member 16). As illustrated in FIG. 2, the push pin 46 may be spring biased. More particularly, push pin 46 may be spring biased in a direction parallel to the pivot axis 48 and in a direction toward cover plate 62. To this end, pivot mechanism 10 may include a spring 78 having one end configured to engage the push pin 46, such as adjacent an inner end 80 thereof, and another end configured to engage the cover plate 64. In one embodiment, for example, the other end of the spring 78 may be configured to engage the solid wall of blind bore 72 formed in cover plate 64. As recognized by those of ordinary skill in the art, other arrangements are also possible to provide a biasing force to push pin 46 in a preferred direction. It should be noted that even though the push pin 46 is spring biased, the inner body portion 50 of push pin 46 remains too large to extend into the aperture 70 of cover plate 62.

In an exemplary embodiment, the spring 78 biases the push pin 46 toward the secured position. In the secured position, the keys 74 engage the keyways 76a in end wall 26 of base member 16 and also engage the keyways 76b in the end wall 40 of rotating member 18. Because the keys 74 engage both keyways 76a, 76b, the rotating member 18 is prevented from rotating relative to base member 16. Moreover, as illustrated in FIG. 1, in the secured position, the push button 56 projects through central aperture 70 in cover plate 62 and slightly beyond an outer surface 82 thereof. This allows a user to depress the push button 56 inwardly and move the push pin 46 toward the release position.

As the push pin 46 is being depressed inwardly against the bias from spring 78, the keys 74 move in a direction parallel to the pivot axis 48 so as to disengage the keyways 76a in the end wall 26 of base member 16. In other words, the keys 74 are positioned inwardly of end wall 26 such that rotation of rotating member 18 is now permitted relative to base member 16. As rotation begins, in either the clockwise or counter-clockwise direction, the end surfaces 84 of keys 74 engage the inner wall surface 86 of end wall 26. Thus, the user may stop pressing push button 56 and the push pin 46 will remain in the release position. The push pin 46 remains in the release position as the rotating member 18 is turned until the next keyway 76a in the end wall 26 is reached. When the next keyway 76a is reached, the bias of spring 78 causes the push pin 46 to move outwardly toward the secured position so that keys 74 re-engage keyways 76a in base member 16 to once again prevent the rotation of rotating member 18 relative to base member 16. When the push pin 46 is depressed, the keys 74, while configured to disengage the keyways 76a, should not disengage the keyways 76b in the end wall 40 of rotating member 18. In this regard, when the push pin 46 is fully depressed, the inner end of push pin 46 may contact the bottom solid wall of blind bore 72 to prevent the keys 74 from disengaging keyways 76b.

The number of keys 74 and keyways 76 may vary depending on the application and the number of positions in which it is desired to fix the relative positions of the first and second elements 12, 14. For example, it is contemplated that in most applications, the push pin 46 may include only one or two keys 74. Of course, more keys 74 are possible should it be necessary to meet the needs or desires of a particular application. The number of keyways 76a in end wall 26 of base member 16 generally corresponds to the number of desired fixed positions between the first and second elements 12, 14. For example, it is contemplated that in most applications, the end wall 26 may be configured to secure one, two or three different relative positions of first and second elements 12, 14. Of course, more keyways and fixed positions are possible should it be necessary to meet the needs or desires of a particular application.

Figure 3:
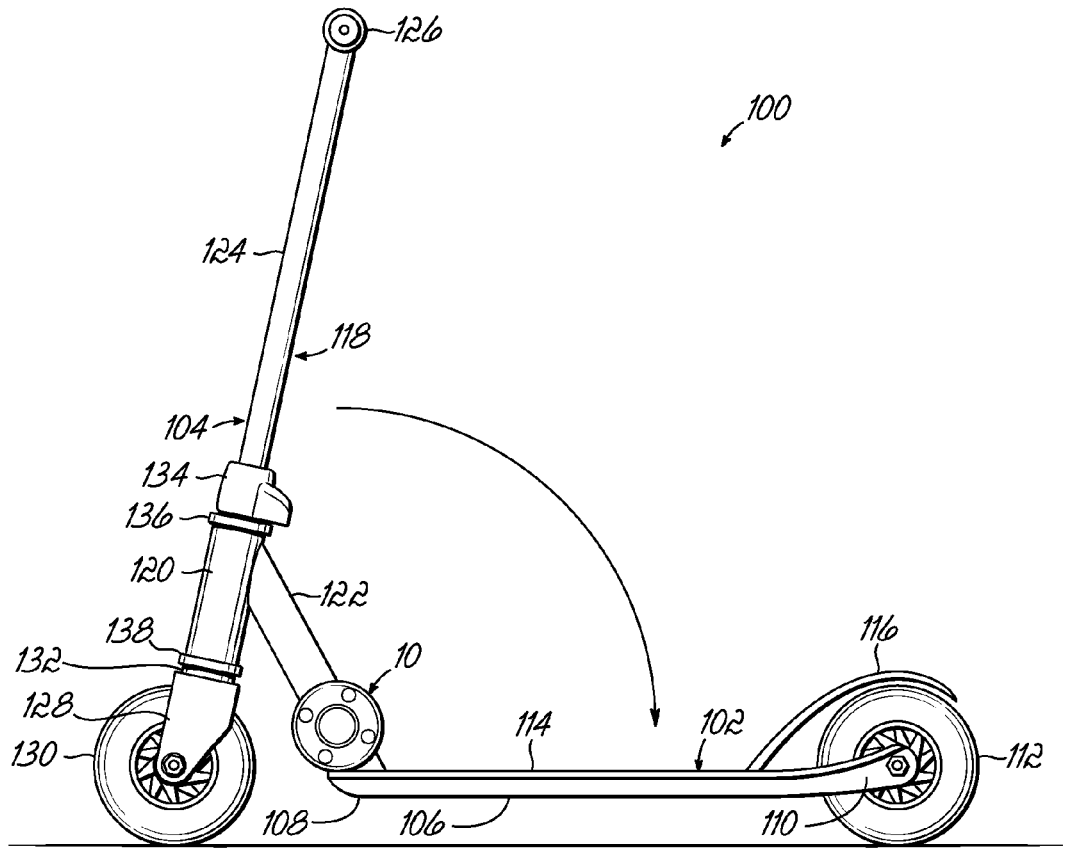
FIG. 3 is a side elevation view of a scooter having a pivot mechanism in accordance with one embodiment of the invention and with the steering assembly in an upright, ready-to-use position.
Figure 4:
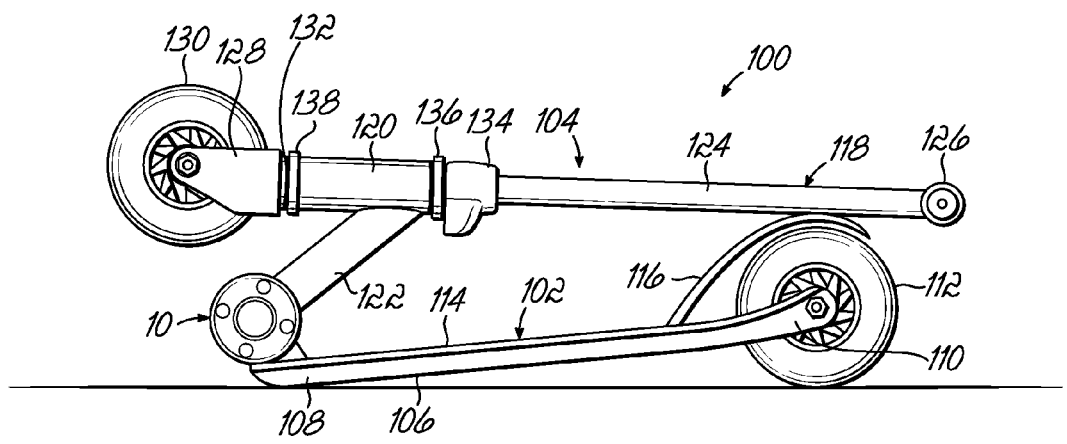
FIG. 4 is a side elevation view of the scooter shown in FIG. 3, but with the steering assembly in a folded position.

The pivot mechanism 10 as described above may be incorporated into a wide range of items including without limitation, scooters, tricycles, bicycles, and other pedaled or non-pedaled vehicles. For example, as shown in FIGS. 3 and 4, pivot mechanism 10 may be incorporated into a scooter 100 to allow a first portion of the scooter 100 to fold relative to a second portion of the scooter 100. As previously discussed, while folding scooters are generally known in the art, the various mechanisms that permit the folding have drawbacks addressed by pivot mechanism 10.

As shown in these figures, scooter 100 includes a first frame member 102 and a second frame member 104 pivotally coupled together via pivot mechanism 10. The first frame member 102 includes a generally elongate support 106 having a first end 108 and a second end 110. The pivot mechanism 10 may be coupled to the first frame member 102 adjacent the first end 108. The second end 110 includes a rear wheel 112 for supporting the scooter 100 on a surface. A platform or deck 114 may be coupled to support 106 and configured to support a rider on the scooter 100. In some embodiments, a brake mechanism 116 may also be provided.

The second frame member 104 includes a steering assembly 118 that allows the user to steer the scooter 100, a head tube 120 configured to receive the steering assembly 118, and a brace or arm 122 that couples the head tube 120 to the pivot mechanism 10. The steering assembly 118 includes a handlebar stem 124 having a handlebar 126 coupled to one end thereof to provide a grasping point for the user to turn or otherwise manipulate the steering assembly 118. The steering assembly 118 also includes a fork 128 having a front wheel 130 rotatably mounted thereto, and a fork stem 132 that extends through head tube 120 and is configured to couple to handlebar stem 124. A cover 134 may be provided at the location where the fork stem 132 and handlebar stem 124 are coupled. The head tube 120 is tubular and receives the steering assembly 118 therethrough. The steering assembly 118 is secured to the head tube 120 via upper and lower bearings 136, 138, respectively. Such a configuration allows the handlebar 126 to be turned in a clockwise or counterclockwise direction to turn the front wheel 130 and thereby control the direction of the scooter 100.

In this embodiment, the base member 16 of pivot mechanism 10 may be coupled to the first frame member 102 while the rotating member 18 may be coupled to the second frame member 104. In operation, when the push pin 46 is in one of its secured positions such that the keys 74 engage the keyways 76a, the second frame member 104 may be in a first position relative to the first frame member 102, wherein the steering assembly 118 is in an upright, ready-to-use position (FIG. 3). To fold the scooter 100, the push button 56 on the push pin 46 may be pressed by a user so as to move the push pin 46 to a release position. When in the release position, the second frame member 104 may be rotated relative to the first frame member 102 toward a second position, wherein the steering assembly 118 is in a folded position (FIG. 4).

In one embodiment, when in the folded position, the push pin 46 may remain in the release position such that there is no positive lock when in this position. In an alternative embodiment, however, when in the folded position, the keys 74 may engage the keyways 76a such that the steering assembly 118 is locked in the folded position. To move the steering assembly 118 back to its ready-to-use position, the push button 56 may be pressed again and the second frame member 104 rotated relative to the first frame member 102. When the steering assembly 118 reaches its ready-to-use position, the keys 74 will again engage the keyways 76a to lock the steering assembly 118 in place.

Figure 5:
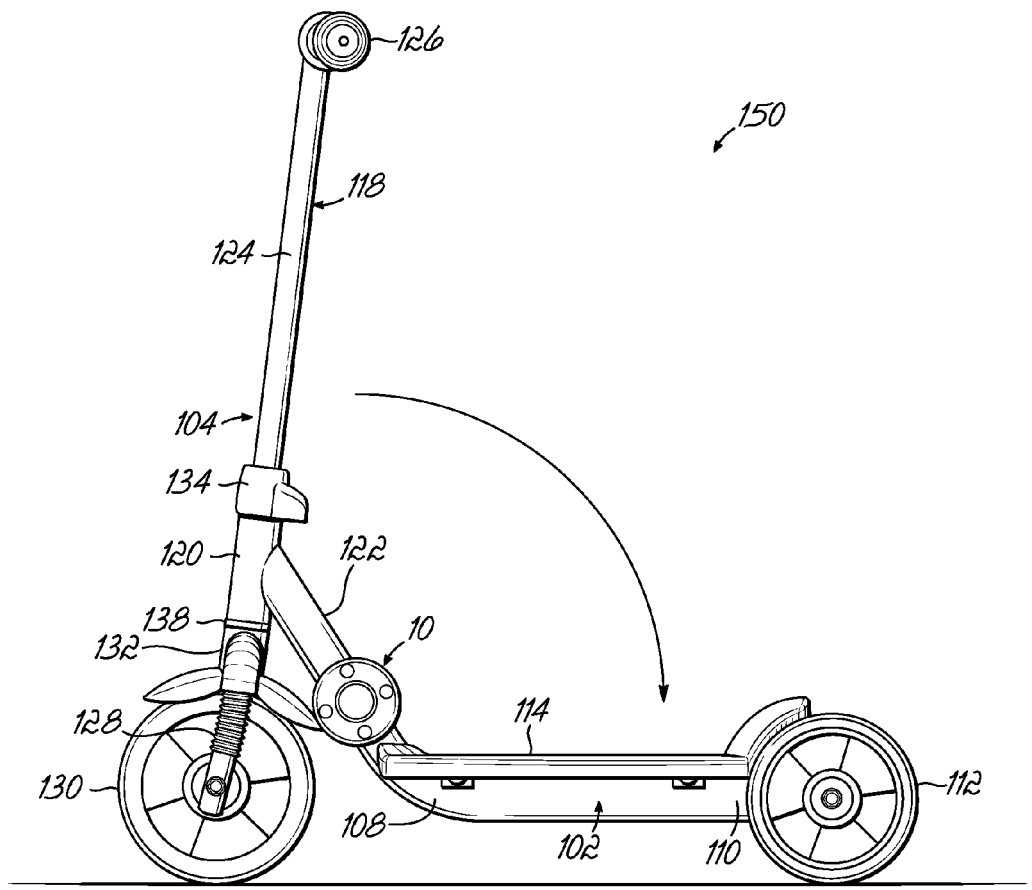
FIG. 5 is a side elevation view of a scooter having a pivot mechanism in accordance with another embodiment of the invention and with the steering assembly in an upright, ready-to-use position.
Figure 6:
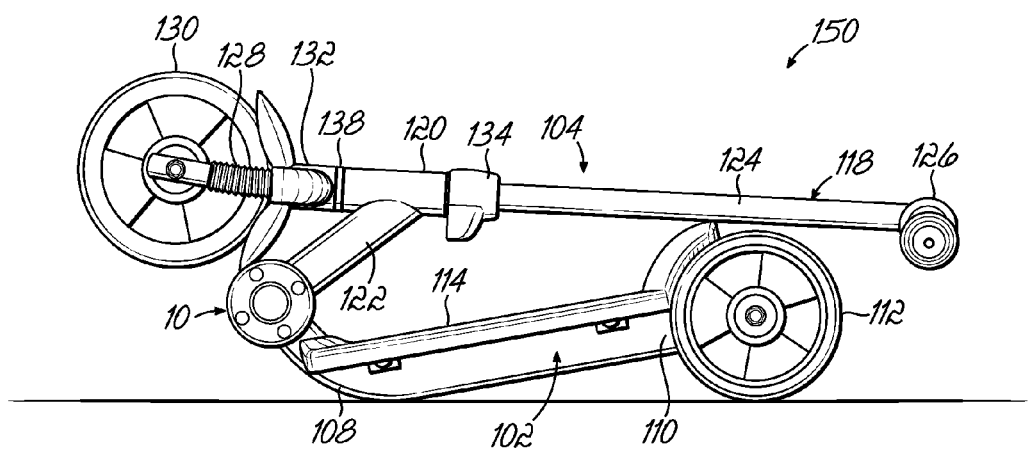
FIG. 6 is a side elevation view of the scooter shown in FIG. 5, but with the steering assembly in a folded position.

The pivot mechanism 10 may be beneficially used on a wide range of scooter designs. For example, U.S. application Ser. No. 29/333,279, filed Mar. 5, 2009, the disclosure of which is incorporated by reference herein in its entirety, and which is assigned to the assignee of the present application, discloses a scooter design having a unique wide deck configuration. That scooter does not include a pivot mechanism that allows the scooter to fold. However, as shown in FIGS. 5 and 6 of the present application, a scooter 150 having a design similar to that disclosed in the '279 application may incorporate pivot mechanism 10 to allow a folding feature. Although having a different design, the nomenclature used to describe FIGS. 3 and 4 may also be used to describe FIGS. 5 and 6. Accordingly, like reference numerals are used to refer to like features in these figures. Moreover, as those of ordinary skill in the art will readily understand the structure and operation of scooter 150 based on the description above directed to scooter 100, for sake of brevity, a detailed description will be omitted herefrom.

The pivot mechanism 10 may also be incorporated into various tricycle designs. By way of example, U.S. Application Ser. No. 61/184,951, filed Jun. 8, 2009, the disclosure of which is incorporated by reference herein in its entirety, and which is assigned to the assignee of the present application, discloses a tricycle having a pivot mechanism. The pivot mechanism 10 as disclosed in the present application may be used in a similar manner as that disclosed in the '951 application.

Figure 7:
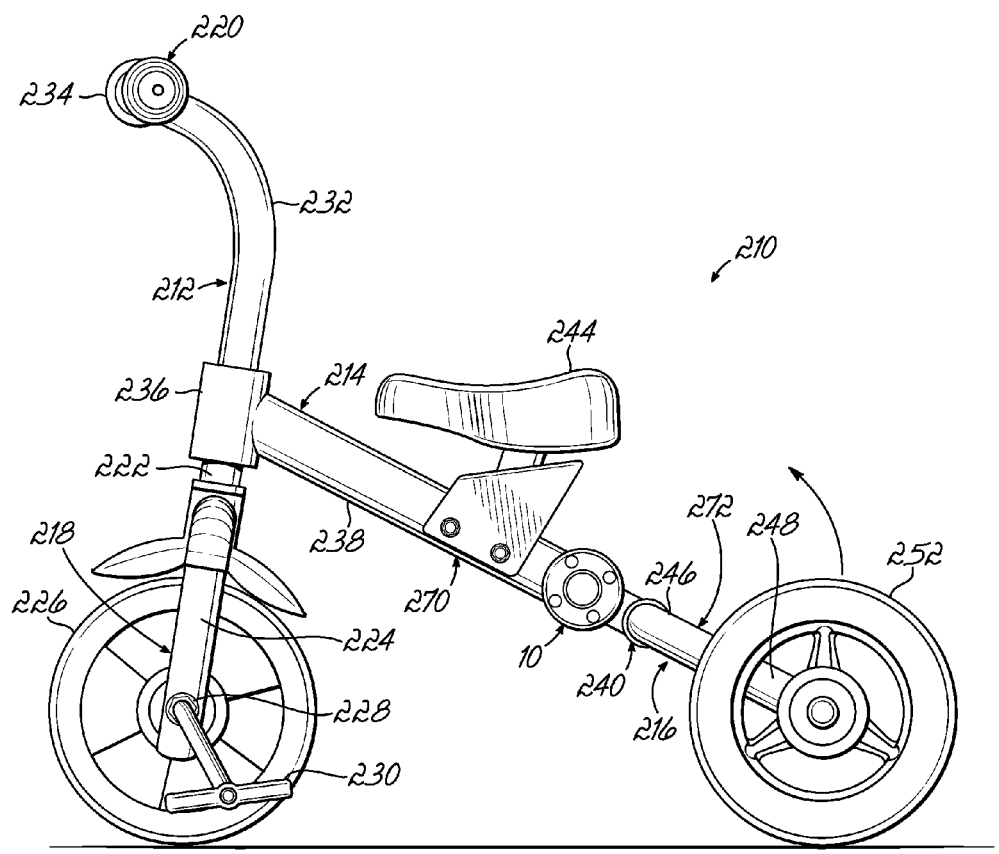
FIG. 7 is a side elevation view of a tricycle having a pivot mechanism in accordance with one embodiment of the invention and with the tricycle in a high-rider configuration.

In this regard, FIG. 7 illustrates a tricycle 210 having pivot mechanism 10 incorporated therein. The tricycle 210 includes a front frame 212, a middle frame 214, and a rear frame 216. The front frame 212 includes a front fork 218 operatively coupled to a handlebar 220. The front fork 218 includes a fork stem 222 and a pair of spaced apart forks or legs 224 extending therefrom in a generally parallel fashion. A front wheel 226, which defines a front axle 228, is positioned between the legs 224 and rotatably coupled thereto so as to allow rotation of the front wheel 226 relative to the front frame 212. A pair of pedals 230 are positioned outboard of the legs 224 of front fork 218 and are operatively coupled to the front wheel 226 (e.g., such as by being coupled to the front axle 228) for allowing the rider to rotate the front wheel 226, and consequently, propel the tricycle 210 in a certain direction dictated by handlebar 220. The handlebar 220 includes a handlebar stem 232 configured to be coupled to the fork stem 222 and a pair of handles 234 configured to be grasped by the rider for turning the tricycle 210 in a desired direction. The handles 234 may include grips or other features that facilitate gripping by the user. Those of ordinary skill in the art will recognize that the handlebar 220 may have a wide variety of shapes and designs and the invention is not limited to the particular embodiment shown herein.

The middle frame 214 includes a head tube 236 configured to be coupled to the front frame 212, one or more frame support elements 238 (one shown in illustrated embodiment), and a knuckle 240 configured to be coupled to rear frame 216. As discussed in more detail below, the front frame 212, and more particularly, at least one of the fork stem 222 and handlebar stem 232 is configured to be inserted through the head tube 236 and rotatably mounted thereto so as to allow the front frame 212 to rotate relative to the middle frame 214, and thereby change the direction of the tricycle 210 through the rotation of handlebar 220. As illustrated in FIG. 7, the frame support element 238 includes a saddle 244 on which the rider of the tricycle 210 sits.

In the exemplary embodiment shown in FIG. 7, the rear frame 216 includes a generally U-shaped member having a middle portion 246 and end portions 248, on either side thereof. The middle portion 246 is configured to be coupled to the middle frame 214 at knuckle 240. Moreover, each end portion 248 includes a rear wheel 252 rotatably coupled adjacent an end thereof so as to allow rotation of the rear wheels 252 relative to the rear frame 216.

The tricycle 210 may include a pivot mechanism 10 that defines a first frame portion 270 and a second frame portion 272 pivotally coupled together via pivot mechanism 10. The position of pivot mechanism 10 within the tricycle 210 may be selected to provide several desirable configurations for tricycle 210. For example, as more fully disclosed in the '951 application, it may be desirable for tricycle 210 to have a high rider configuration, a low rider configuration, and a storage configuration. Pivot mechanism 10 may provide each of these configurations for tricycle 210. Similar to that disclosed in the '951 publication, such configurations may be achieved with pivot mechanism 10 when pivot mechanism 10 is positioned adjacent knuckle 240. More particularly, in one embodiment, the pivot mechanism 10 may be disposed in middle frame 214 adjacent knuckle 240.

Figure 8:
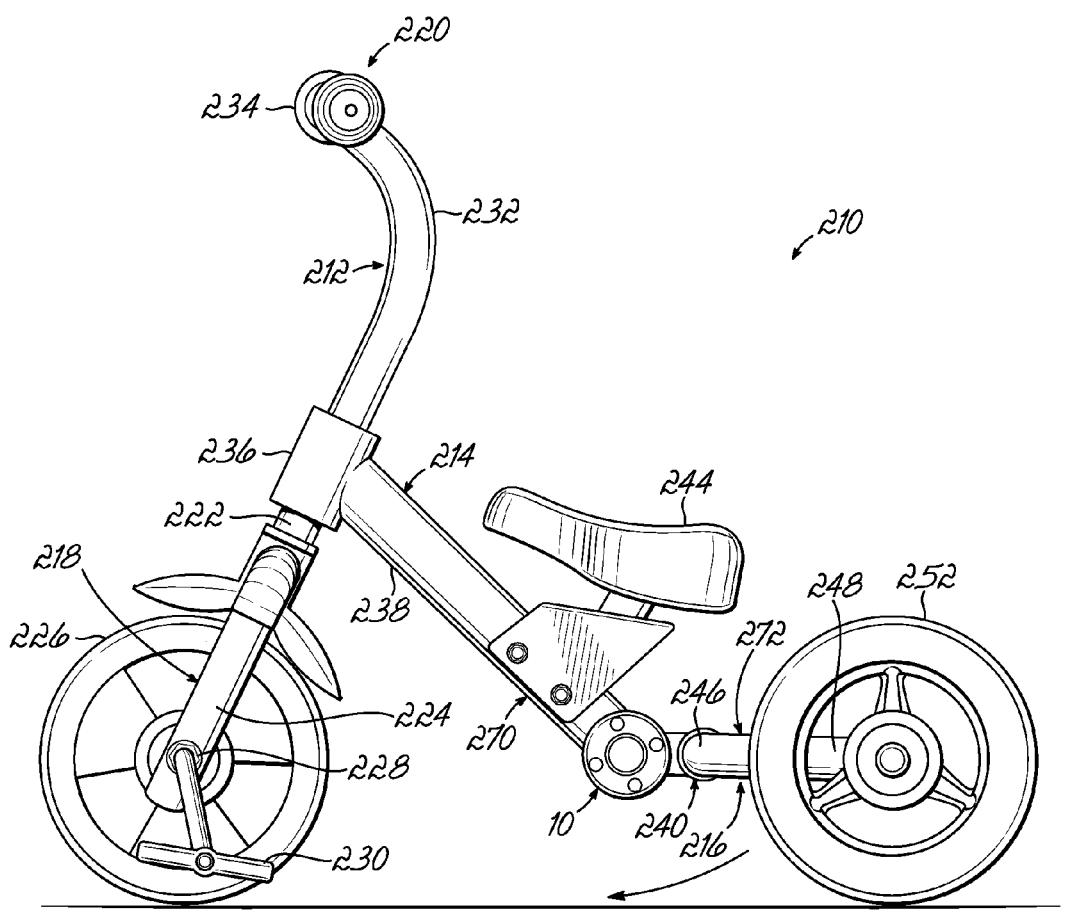
FIG. 8 is a side elevation view of the tricycle shown in FIG. 7, but in a low rider configuration.
Figure 9:
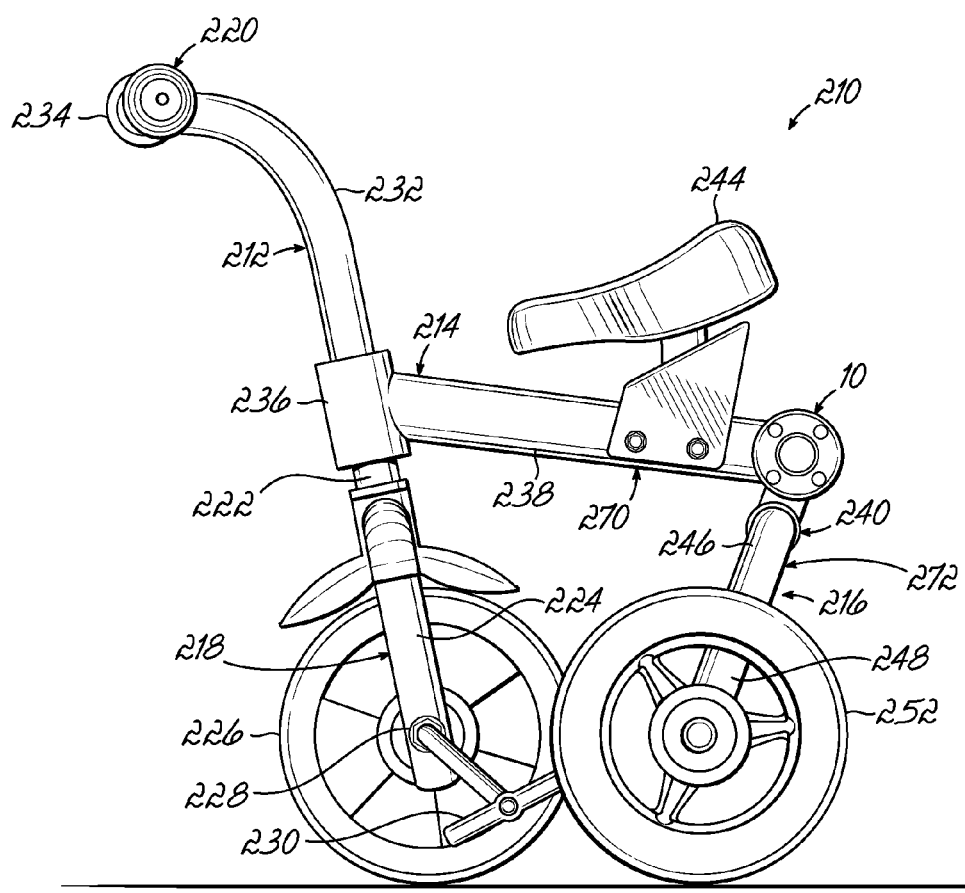
FIG. 9 is a side elevation view of the tricycle shown in FIG. 7, but in a storage configuration.

In operation, when the push pin 46 is in a first secured position, such that the keys 74 engage the keyways 76a in base member 16, the tricycle 210 may have a high rider configuration, as shown in FIG. 7. Moreover, when the push pin 46 is in a second secured position, the tricycle 210 may have a low rider configuration, as shown in FIG. 8. Furthermore, when the push pin 46 is in a third secured position, the tricycle 210 may have a storage configuration, wherein the rear wheels 252 are essentially tucked underneath the middle frame 214 to make tricycle 210 more compact for storage, as shown in FIG. 9.

To move between the various configurations, a user pushes the push pin 46 inward and toward the release position. At this point, the first frame portion 270 and a second frame portion 272 may be rotated relative to each other. As explained above, when the next keyway 76a in end wall 26 is encountered, the push pin 46 essentially snaps outwardly due to the spring biasing so that keys 74 engage keyways 76a to define a secured position. Such a pivot mechanism 10 allows the tricycle 210 to be converted between various desired positions in a quick, reliable, and easy manner. Moreover, the pivot mechanism 10 discussed above is believed to overcome many of the shortcomings of pivot mechanisms used in existing convertible tricycles. By way of example, the design is relatively low cost, relatively simple and minimizes or eliminates sharp edges and potential pinch points.

While the present invention has been illustrated by a description of various preferred embodiments and while these embodiments have been described in some detail, it is not the intention of the inventor to restrict or in any way limit the scope of the appended claims to such detail. Additional advantages and modifications will readily appear to those skilled in the art. For example, while the improved features disclosed herein have been described in the context of scooters and tricycles, it should be recognized that many of these features may be beneficial to bicycles and possibly other vehicles, or other components associated with these vehicles and therefore, aspects of the invention should not be limited to being applicable to only scooters and tricycles. Thus, the various features of the invention may be used alone or in any combination depending on the needs and preferences of the user.

What is claimed is:

1. A pivot mechanism, comprising:
   a base member configured to be coupled to a first element and having a bottom wall, a pair of opposed side walls, and a pair of opposed end walls that collectively define a cavity, at least one of the end walls having a first aperture;
   a generally cylindrical rotating member configured to be coupled to a second element and having a side wall and a pair of opposed end walls, the rotating member at least partially positioned within the cavity in the base member, and at least one of the end walls having a second aperture;
   an elongate pin extending through the first and second apertures of the base member and rotating member and defining a pivot axis, wherein the rotating member is capable of rotating relative to the base member about the pivot axis to provide relative movement between the first and second elements;
   at least one key coupled to the elongate pin; and
   at least one keyway positioned on each of the base member and rotating member,
   wherein the elongate pin is movable in a direction generally parallel to the pivot axis between a secured position in which the rotating member is prevented from rotating relative to the base member, and a release position in which the rotating member is permitted to rotate relative to the base member,
   wherein the key engages the keyways of both the base member and rotating member when the elongate pin is in the secured position.

2. The pivot mechanism of claim 1, wherein the end walls of the base member have a lower portion and an upper portion, the upper portion defining a generally arcuate surface.

3. The pivot mechanism of claim 1, wherein the side walls of the base member extend for only a portion of the height of the base member end walls.

4. The pivot mechanism of claim 1, wherein the side walls of the base member define the range of rotation of the rotating member relative to the base member.

5. The pivot mechanism of claim 1, further comprising at least one cover plate for securing the pin to the base member and the rotating member.

6. The pivot mechanism of claim 1,
   wherein when the key engages the keyway of the base member, the rotating member is prevented from rotating relative to the base member and when the key disengages the keyway of the base member, the rotating member is permitted to rotate relative to the base member.

7. The pivot mechanism of claim 1, wherein the pin is spring biased toward the secured position.

8. A scooter, comprising:
   a first frame portion having a deck and a rear wheel;
   a second frame portion having a steering assembly with a front wheel and a handlebar; and
   a pivot mechanism coupled to the first and second frame portions to provide pivotal movement therebetween, the pivot mechanism comprising:
      a base member configured to be coupled to a first element and having a bottom wall, a pair of opposed side walls, and a pair of opposed end walls that collectively define a cavity, at least one of the end walls having a first aperture;
      a generally cylindrical rotating member configured to be coupled to a second element and having a side wall and a pair of opposed end walls, the rotating member at least partially positioned within the cavity in the base member, and at least one of the end walls having a second aperture;
      an elongate pin extending through the first and second apertures of the base member and rotating member and defining a pivot axis, wherein the rotating member is capable of rotating relative to the base member about the pivot axis to provide relative movement between the first and second elements;

at least one key coupled to the elongate pin; and at least one keyway positioned on each of the base member and rotating member, wherein the elongate pin is movable in a direction generally parallel to the pivot axis between a secured position in which the rotating member is prevented from rotating relative to the base member, and a release position in which the rotating member is permitted to rotate relative to the base member, wherein the key engages the keyways of both the base member and rotating member when the elongate pin is in the secured position.

9. The scooter of claim 8, wherein when the key engages the keyway of the base member, the rotating member is prevented from rotating relative to the base member and when the key disengages the keyway of the base member, the rotating member is permitted to rotate relative to the base member.

10. The scooter of claim 8, wherein the pivot mechanism defines a ready-to-use position of the scooter and a folded position of the scooter.

11. A tricycle, comprising:

a first frame portion having a steering assembly with a front wheel and a handlebar;

a second frame portion having a pair of rear wheels; and a pivot mechanism coupled to the first and second frame portions to provide pivotal movement therebetween, the pivot mechanism comprising:

a base member configured to be coupled to a first element and having a bottom wall, a pair of opposed side walls, and a pair of opposed end walls that collectively define a cavity, at least one of the end walls having a first aperture;

a generally cylindrical rotating member configured to be coupled to a second element and having a side wall and a pair of opposed end walls, the rotating member at least partially positioned within the cavity in the base member, and at least one of the end walls having a second aperture;

an elongate pin extending through the first and second apertures of the base member and rotating member and defining a pivot axis, wherein the rotating member is capable of rotating relative to the base member about the pivot axis to provide relative movement between the first and second elements;

at least one key coupled to the elongate pin; and at least one keyway positioned on each of the base member and rotating member, wherein the elongate pin is movable in a direction generally parallel to the pivot axis between a secured position in which the rotating member is prevented from rotating relative to the base member, and a release position in which the rotating member is permitted to rotate relative to the base member, wherein the key engages the keyways of both the base member and rotating member when the elongate pin is in the secured position.

12. The tricycle of claim 11, wherein when the key engages the keyway of the base member, the rotating member is prevented from rotating relative to the base member and when the key disengages the keyway of the base member, the rotating member is permitted to rotate relative to the base member.

13. The tricycle of claim 11, wherein the pivot mechanism defines a high rider configuration and a low rider configuration for the tricycle.

14. The tricycle of claim 13, wherein the pivot mechanism further defines a storage configuration for the tricycle.

15. A method for pivoting a first frame portion relative to a second frame portion using a pivot mechanism having a base member coupled to the first frame portion, a rotating member coupled to the second frame portion, and an elongate pin defining a pivot axis and having at least one key coupled to the pin, the key configured to be coupled to at least one keyway on each of the base member and rotating member, wherein the rotating member is capable of rotating relative to the base member about the pivot axis to provide relative movement between the first and second frame portions, comprising:

moving a push button in a first direction generally parallel to the pin to disengage the key from the keyway of the base member;

rotating the rotating member relative to the base member when the key and keyway of the base member are disengaged; and moving the push button in a second direction generally parallel to the pin to engage the key with the keyways of the base member and rotating member to lock the relative positions of the first and second frame portions.

16. The method of claim 15, further comprising:

biasing the pin in the second direction so that moving the push button comprises releasing the push button and allowing the pin to move in the second direction under the biasing.

17. The pivot mechanism of claim 1, wherein the at least one keyway of the base member is in open communication with the first aperture.

18. The pivot mechanism of claim 1, wherein the at least one keyway of the rotating member is in open communication with the second aperture.

19. The pivot mechanism of claim 1, wherein a plurality of keys are positioned on a single elongate pin.

20. The pivot mechanism of claim 7, wherein a spring is coaxially disposed about the pivot axis.

21. The pivot mechanism of claim 1, wherein the push button is configured to pass through the first and second apertures.

22. A pivot mechanism, comprising:

a base member configured to be coupled to a first element and having a bottom wall, a pair of opposed side walls, and a pair of opposed end walls that collectively define a cavity, at least one of the end walls having a first aperture;

a generally cylindrical rotating member configured to be coupled to a second element and having a side wall and a pair of opposed end walls, the rotating member at least partially positioned within the cavity in the base member, and at least one of the end walls having a second aperture; and an elongate pin extending through the first and second apertures of the base member and rotating member and defining a pivot axis, wherein the rotating member is capable of rotating relative to the base member about the pivot axis to provide relative movement between the first and second elements, wherein the elongate pin is movable in a direction generally parallel to the pivot axis between a secured position in which the rotating member is prevented from rotating relative to the base member, and a release position in which the rotating member is permitted to rotate relative to the base member, wherein a position of the elongate pin is fixed relative to the rotating member, such that the elongate pin rotates with the rotating member in the release position.

\* \* \* \* \*